US007966245B2

(12) United States Patent
Harrison

(10) Patent No.: US 7,966,245 B2
(45) Date of Patent: Jun. 21, 2011

(54) FINANCIAL INSTRUMENT FOR A SPECIFIC DELIVERABLE PRODUCT ON A DAILY SETTLEMENT BASIS

(76) Inventor: James A. Harrison, Chicago, IL (US)

( * ) Notice: Subject to any disclaimer, the term of this patent is extended or adjusted under 35 U.S.C. 154(b) by 1192 days.

(21) Appl. No.: 10/935,573

(22) Filed: Sep. 7, 2004

(65) Prior Publication Data

US 2006/0080208 A1    Apr. 13, 2006

(51) Int. Cl.
*G06Q 40/00*    (2006.01)
(52) U.S. Cl. .......................... 705/37; 705/35
(58) Field of Classification Search .......... 705/35, 705/37
See application file for complete search history.

(56) References Cited

U.S. PATENT DOCUMENTS

| | | | |
|---|---|---|---|
| 6,029,146 A * | 2/2000 | Hawkins et al. ............ | 705/35 |
| 6,304,858 B1 * | 10/2001 | Mosler et al. ............ | 705/37 |
| 2002/0023035 A1 | 2/2002 | Kiron et al. | |
| 2002/0128951 A1 | 9/2002 | Kiron et al. | |
| 2002/0174043 A1 | 11/2002 | Gilbert et al. | |
| 2003/0135410 A1 | 7/2003 | Chapman et al. | |
| 2003/0149653 A1 | 8/2003 | Penney et al. | |
| 2003/0195822 A1 | 10/2003 | Tatge et al. | |
| 2004/0107158 A1 | 6/2004 | Odom et al. | |
| 2005/0060255 A1 * | 3/2005 | Heaton ............ | 705/37 |

OTHER PUBLICATIONS

"CBOT to Launch When—Issued 1-Year Treasury Note Futures Contract", Chicago Board of Trade, Apr. 29, 2004.
"Welcome to Cantor", http://www.cantor.com, printed Mar. 14, 2004.
"e-Speed: Welcome", http://www.espeed.com, printed Mar. 14, 2004.
"Welcome to the New Fixed Income Clearing Corporation", printed Mar. 14, 2004.
"Welcome to ICAP", http://www.icap.com, printed Mar. 14, 2004.
"BrokerTec: Home", http://www.brokertec.com, printed Mar 14, 2004.
"Over the Counter Market: Dictionary Entry and Meaning", hyperdictionary, printed Mar. 14, 2004.
"Asset-backed Securities", Financial Service Facts, http://financialservicefacts.org, printed Mar. 14, 2004.
"Mortgage Backed Securities—MBS", Investopedia, printed Mar. 14, 2004.
"Last Auctions OATs", printed Mar. 4, 2004.
"Bond Search Results", FMSbonds, https://cserver1.critrade.com, printed Mar. 14, 2004.
"Stock Exchanges Worldwide", http://www.tdd.lt/slnews/Stock_Exchanges/Stock.Exchange, printed Mar. 14, 2004.
"U.S. Securities and Exchange Commission—Home Page", printed Mar. 14, 2004.
"CFTC Home Page", printed Mar. 14, 2004.
"DTCC", The Depository Trust & Clearing Corporation, http://www.dtcc.com, printed Mar. 14, 2004.
"Welcome to the New Fixed Income Clearing Corporation", printed Mar. 14, 2004.
"The Options Clearing Corporation", printed Mar. 14, 2004.

(Continued)

*Primary Examiner* — James A Kramer
*Assistant Examiner* — James A Vezeris
(74) *Attorney, Agent, or Firm* — Foley & Lardner LLP

(57) ABSTRACT

A new class of instruments extends the use or operation of futures contracts to encompass specific deliverable products on a daily settlement basis. These new instruments can be created to cover a wide range of market sectors and financial classes. The new instruments are exchange traded instruments that define exactly and exclusively the instrument to be exchanged at the end of the trading period.

21 Claims, 6 Drawing Sheets

OTHER PUBLICATIONS

Welcome to the National Securities Clearing Corporation, printed Mar. 14, 2004.
Bank for International Settlements:, printed Mar. 14, 2004.
"Last Auctions BTANs", updated Feb. 19, 2004, printed Mar. 14, 2004.
"Primary Dealer List", Federal Reserve Bank of New York, printed Mar. 14, 2004.
"Single Stock Futures Contract Specs", OneChicago, http://www.onechicago.com, printed Feb. 5, 2004.
"The Chicago Board of Trade", http://www.cbot.com, printed Jan. 14, 2004.
"CBOT Introduction", Chicago Board of Trade, http://www.cbot.com.

* cited by examiner

FINANCIAL INSTRUMENT FOR A SPECIFIC DELIVERABLE PRODUCT ON A DAILY SETTLEMENT BASIS

BACKGROUND OF THE INVENTION

1. Field of the Invention

The present invention relates generally to financial instruments and trading systems. More particularly, the present invention relates to future contracts for specific deliverable products on a daily settlement basis.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

A financial instrument can be (1) a debt instrument, which is a loan with an agreement to pay back funds with interest; (2) an equity security, which is share or stock in a company, (3) a commodity instrument, which is an agreement to exchange money for goods or materials, e.g. gold, corn, oil, etc., or (4) derivatives, e.g., swaps, options, swaptions, etc. Financial instruments can include bonds, stocks, futures contracts, forward contracts, or option contracts. Other financial instruments, variations or combinations of these financial instruments may also exist.

A futures contract is a legally binding contract to buy or sell a commodity or financial instrument at a certain price for future delivery. Futures markets thrive because they attract two types of traders: hedgers and speculators. Hedgers, such as producers and processors of commodity products, seek to protect against adverse changes in the underlying cash price that may impact their business. Speculators include investors and traders who want to profit from price changes. Speculators and oppositely-positioned hedgers accept the price risks and rewards that hedgers wish to avoid. Futures markets provide the forum in which speculators can buy or sell standard guaranteed contracts quickly and—just as quickly—exit their positions to react to market changes.

Typically, futures contracts are traded through an auction like process, with all bids and offers on each contract made public. Through this, a market price is reached for each contract, based primarily on the laws of supply and demand. Traditionally, futures contracts have been traded in an open outcry environment where traders and brokers in brightly colored jackets shout bids and offers in a trading pit or ring. As of 2004, open outcry is still the primary method of trading agricultural and other physical commodity futures in the U.S., but trading in many financial futures in the U.S. has been migrating to electronic trading platforms (where market participants post their bids and offers on a computerized trading system). Almost all futures trading outside the U.S. is now conducted on electronic platforms.

Options on financial instruments (puts and calls) are derivative products whose value is derived from, among other factors, the underlying financial instruments, usually futures contracts or indexes. Option contracts are traded through an auction like process similar to futures trading. Options are traded either electronically or via open outcry.

Significant barriers to trading cash instruments exist, such as high transaction costs, exclusivity of markets, and incomplete information. In the particular case of trading United States government securities, transaction costs on Cantor Fitzgerald's eSpeed® electronic system can be as high as $18 per $1,000,000 face value. Such transaction costs may limit trading. In addition, many mutual funds do not have access to the eSpeed® Cantor electronic system. Such limited access leads to an exclusionary cash treasury market. Also, primary government securities dealers are currently not required to publish their transactions to the general public, leading to incomplete information for many market participants. As an example, FIG. 1 illustrates a conventional cash treasuries trading system. In this conventional system, customers 2 contact primary dealers 4 who access a trading system 6 to execute trades (buying, selling, etc.). The trading system 6 can be the eSpeed trading platform, the BrokerTek trading platform, or other similar existing trading platforms. Professional traders 8 ("locals") also access the trading system 6.

Similar barriers exist in many markets for trading options on cash instruments. For example, the margins required to trade and hold positions in options on cash United States government securities are several times greater than the margin required to trade and hold positions in options on the same notional amount of U.S. treasury futures. A comparable lack of trade information and high execution costs plagues this market as well. In addition, the high barriers for trading options on cash treasuries cause many portfolio managers to hedge with futures and options that are mismatched to their portfolios, that is, the options track the futures contract and not necessarily the components comprising their portfolios. Furthermore, most options on cash instruments trade over-the-counter (OTC) between two counterparties, giving rise to default risk.

Thus, there is a need for a new class of financial instruments that addresses these and other shortcomings in traditional financial instruments and trading systems. Further, there is a need for new financial instruments that mirror cash ("spot") instruments but which can be applied over a wide range of market sectors and financial classes. Even further, there is a need to have future contracts for specific deliverable products on a daily settlement basis

SUMMARY OF THE INVENTION

In general, the invention relates to a new class of instruments that encompasses specific deliverable products on a daily or fixed settlement basis. These new instruments can be created to cover a wide range of market sectors and financial classes. The new instruments define exactly and exclusively the instrument to be exchanged at the end of a trading period.

Advantages of trading these new instruments include, but are not limited to, reduced transaction costs and more public and transparent pricing. The new instruments can be traded on an exchange clearing house and can be available to large and small institutions, including mutual funds and pension funds. They can be priced in any currency and in any quantity, to be delivered at any location or distribution point anywhere in the world.

One exemplary embodiment relates to a financial instrument covering specific deliverable products on a fixed settlement basis. The financial instrument includes a standardized contract obligating a buyer and a seller to settle the contract based on a price of the contract at a first effective date, through an exchange clearing house that guarantees payment to the buyer of any amount owed to the buyer from the seller as a result of the contract and that guarantees payment to the seller of any amount owed to the seller from the buyer as a result of the contract. The standardized contract is an exchange traded instrument that defines exactly and exclusively an instrument to be exchanged upon settlement at the end of the first effective date.

Another exemplary embodiment relates to a method of trading financial instruments covering specific deliverable products on a daily or fixed settlement basis. The method includes trading a standardized contract obligating a buyer and a seller to settle the contract based on a price of the contract at a first effective date, through an exchange clearing housing that guarantees payment to the buyer of any amount owed to the buyer from the seller as a result of the contract and that guarantees payment to the seller of any amount owed to the seller from the buyer as a result of the contract. The standardized contract is an exchange traded instrument that defines exactly and exclusively an instrument to be exchanged upon settlement at the end the first effective date.

Another exemplary embodiment relates to a system of trading financial instruments covering specific deliverable products on a daily settlement basis. The system includes an exchange clearing house of financial instruments and an exchange access that enables trading facilitated by the exchange clearing house. The exchange clearing house facilitates trading of a contract to deliver a specific product at the end of a fixed period at a then defined purchase price of the specific product.

DETAILED DESCRIPTION OF EXEMPLARY EMBODIMENTS

Figure 1:
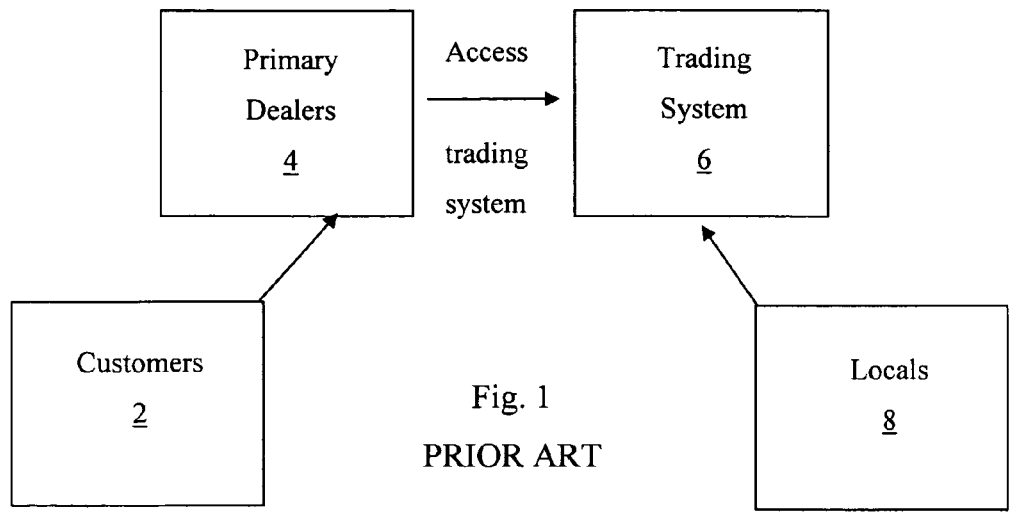
FIG. 1 is a general block diagram depicting a conventional trading system.
Figure 2:
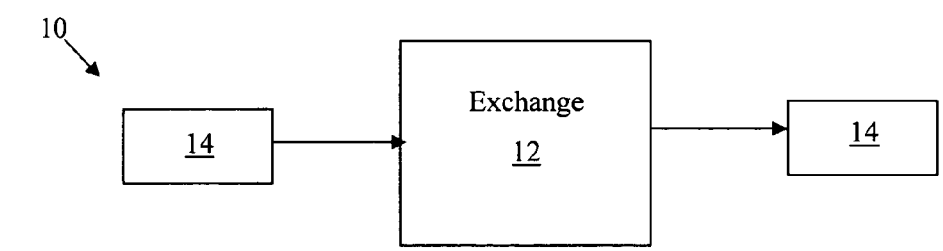
FIG. 2 is a diagram depicting a trading system in accordance with an exemplary embodiment.
Figure 2:
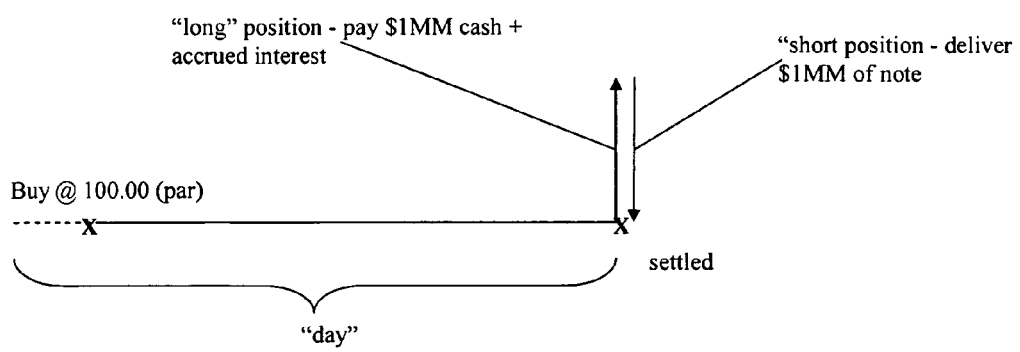

FIG. 2 illustrates a trading system 10 including a new class of financial instruments. In the trading system 10, an exchange 12 provides for the trading of financial instruments including new instrument 14. The new instrument 14 converts to its underling cash instrument at the end of the trading day (or any other defined time period). In an exemplary embodiment, settlement is at the price at which the trade occurred. In another exemplary embodiment, settlement is at some predetermined price ("set price"), with the difference between trade price and set price settled in cash (or by some other means).

The new instrument 14 is defined as an agreement to exchange currency for a specified instrument, asset, or commodity at the end of each trading day (or other time period). By way of example, consider a recently auctioned U. S. ten-year treasury note (the "on-the-run" ten-year note). The new instrument 14 can be defined to convert to $1,000,000 notional amount at the end of each trading day. Trading of the new instrument 14 constitutes an agreement to exchange $1,000,000 of the current ten-year note for the equivalent purchase price dollar amount at the end of the day. Continuing the example, the purchaser of the new instrument 14 buys one of the new instruments at a price of 100.00 (par). At the end of the day if the purchaser is still long the instrument, the person who is short must exchange, or deliver, $1,000,000 face value of the current ten-year note to the buyer in exchange for $1,000,000 cash (plus accrued interest).

The new instrument 14 can be listed at, for example, the Chicago Board of Trade or other exchange, and trading conducted in the established trading environment, electronically or via open-outcry. One example method of trading the new instruments 14 is described below with reference to FIG. 3. The exchange of funds at the end of the day can be implemented using a trading platform and processed though a primary dealer or the Fixed Income Clearing Corporation. One such trading example is described below with reference to FIG. 4.

The new instrument 14 allows for the exchange of currency for the underlying asset or commodity. For example, consider the United States ten-year futures contract traded at the Chicago Board of Trade. Currently, the person who is short a future (the "seller") can deliver any U.S. Treasury notes maturing at least 6½ years, but not more than 10 years, from the first day of the delivery month. Furthermore, the seller may deliver the appropriate note at any time during the entire delivery month. The person who is long a future must accept delivery of any U. S. Treasury note in the pool of available notes. In contrast, the new instruments 14 are completely defined in terms of delivery time and actual treasury note.

The new instrument 14 has no variation in the delivery instrument. In an exemplary embodiment, the new instruments 14 define exactly and exclusively the instrument to be exchanged at the end of the trading period. The new instrument 14 expires at the end of each trading day (or other time period). There is neither a delivery month nor a variation in the exchange time. The new instrument 14 replicates the underlying cash instrument (spot market instrument) by converting to the underlying instrument at the end of each trading day (or other time period).

Advantages of trading the new instrument 14 can include reduced transaction costs and more public and transparent pricing, especially if the new instruments are traded on an established, regulated exchange. For example, currently, when a large mutual fund or pension fund wants to buy $200,000,000 notional amount of current ten-year notes, it must call a primary dealer to obtain a trading price and make the trade. The price and size information are not widely disseminated. The dealer may then elect to offset the trade on a secondary market, e.g. Cantor's eSpeed® or ICAP's BrokerTec, at a profit. In contrast, the new instrument 14, if traded on an exchange, is fully available to large and small institutions, including mutual funds and pension funds, thus eliminating the need for a primary dealer to act as intermediary.

The new instrument 14 can be traded on all spot (cash) markets and over-the-counter markets. Markets for which the new instrument 14 can be used are listed below. Each instrument can be priced in any currency and in any quantity, to be delivered at any location or distribution point anywhere in the world.

Markets for the new instrument 14 can include metals markets (e.g., gold, silver, platinum, palladium, lead, steel, aluminum, copper, scrap metal); petroleum markets (e.g., Brent sea crude oil, crude oil, heating oil, unleaded gasoline, ethylene, propylene, acetylene, natural gas, various plastics) at any delivery point anywhere in the world; energy markets (e.g., electricity, hydroelectric power, wind generated electricity, solar power, geothermal power, coal, coal shale, solid-phase methane, propane) at any distribution point or hub, in any contract size, anywhere in the world; and grains markets (e.g., corn, wheat, winter wheat, soybeans, soybean oil, canola oil, rice, rough rice, sorghum) at various delivery points anywhere in the world. The new instrument 14 can also be used in interest rate markets (e.g., U. S. treasuries (all maturities, for example, one month bills, two month bills, three month bills, six month bills, one year bills, two year notes, five year notes, ten year notes, bonds), agency debt instruments (debt issued by Federal Farm Credit System Banks, Federal Home Loan Banks, Federal Home Loan Mortgage Corporation (Freddie Mac), Federal National Mortgage Association (Fannie Mae), Student Loan Marketing Association (Sallie Mae), Tennessee Valley Authority (TVA), Government National Mortgage Association (Ginnie Mae), etc.), asset backed securities (debt backed by credit cards, home equity loans, automobile loans, student loans, Equipment leases, Manufactured housing, mortgage backed securities) issued by any entity anywhere in the world. Other markets may include:

- Corporate debt markets (issued by any corporation in any maturity with any coupon, for example all corporate debt issued by General Motors, IBM, Lucent Technologies, etc., convertible bonds issued by any corporation in any maturity with any coupon with any stock strike price, etc.).
- Sovereign debt treasuries markets (any debt instrument, notes, bills, and bonds issued by any foreign government anywhere in the world, for example those issued by the German government (two-year Schatz (or Bundesschatzanweisungen), five-year Bobls (or Bundesobligationen), and ten-year Bunds (or Bundesanleihen), etc.), and the French government (two-year BTANs, five-year BTANs, ten-year OATs, etc.), etc.
- Municipal bonds markets (any debt instrument of any state in the United States with any coupon and any maturity, carrying any rating and tax status; any debt instrument of any county, city, or other government agency (for example municipal bonds)), listed anywhere in the United States or elsewhere in the world.
- Stock markets (all stocks listed on any exchange anywhere in the world, for example on the NASDAQ, the NYSE, the London Stock Exchange, pink sheets, etc.; stock indices of any stock market anywhere in the world, for example, the DOW, S&P500, DAX, CAC, Nikkei, TEPIX, etc.; all preferred stocks; etc.).
- Other Financial instruments markets (interest rate swaps, currency swaps, exotic options, swaptions, or any other derivative, etc.) anywhere in the world.
- Currency markets (any currency exchanged for any other currency in the world, for example, U. S. dollar/Japanese Yen, Euro/Ruble, Swiss Franc/British Pound, Rand/Rupee, etc.) in any denomination.
- Foodstuffs, Livestock, and Meat markets (cocoa, coffee, eggs, butter, milk (all classes), live cattle, feeder cattle, lean hogs, pork bellies, catfish, salmon, U. S. sugar, world sugar, frozen concentrated orange juice, etc.) for delivery in any quantity at any location in the world.
- Soft products markets (cotton, wool, hemp, rayon, etc.) for delivery in any quantity at any location in the world.
- Building products markets (U. S. lumber, world lumber, random length lumber, hardwoods, plywood, cement, concrete, gypsum, sand, plaster, glass, iron beams, plastic lumber, pipes (water, electrical, sewage, etc.), wires, lighting, etc.) for delivery in any quantity at any location in the world.
- Other product markets (microchips, computer memory chips, pure silicon, newsprint, paper products, iron ore, bulk chemicals, weather, heating degrees, cooling degrees, hurricane, natural gas transport, electrical energy transport, etc.) for delivery in any quantity at any location in the world.
- Any other Securities markets that are regulated by: the SEC, CFTC, DTCC, FICC, OCC, NSCC, BIS, or any other regulatory agency in the world, etc.

In addition, the new instrument 14 can be used with future similar markets not yet traded. Examples of possible markets would be classes of automobiles, housing, various computer products, cell phones, integrated circuit chips, contract labor, cement slabs, roadways, water for delivery at various points, trucking, shipping, rail traffic, air traffic, auto traffic, space and satellite traffic, information bandwidth, earth, rocks, etc.

Figure 3:
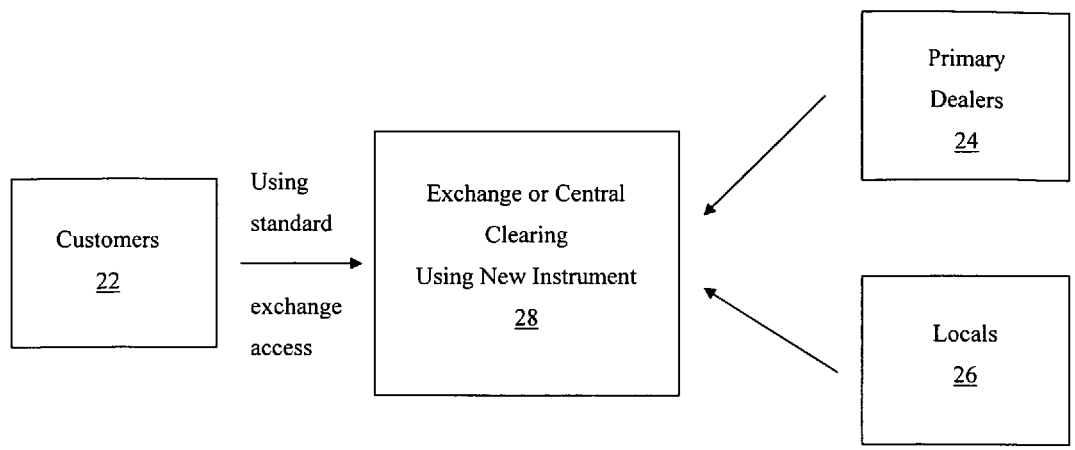
FIG. 3 is a diagram depicting a trading method using the new instrument described with reference to FIG. 2.

FIG. 3 illustrates a trading method using the new instruments 14 described with reference to FIG. 2. Customers 22, primary dealers 24, and locals 26 can access an exchange 28 using an exchange access means and trade using the new instrument 14. Customers 22 can include mutual funds, pension funds, etc. Locals 26 can include professional traders. In the trading of the new instrument 14, customers 22 use a standard exchange access to buy or sell the instruments with the exchange 28. Any of a variety of positions can be taken. Primary dealers 24 and locals 26 can also make trades of the new instrument 14.

By way of example of the variations that can be used in trading the new instrument, in an alternative embodiment, the new instrument is a future of the new instrument 14. This future can have an end of the month settlement date; however, every day the carry costs (the coupon minus repurchasing costs) are charged (or credited) to accounts with an open position. As a result, delivery of the future note does not occur until delivery day, but all carry costs are adjusted daily. Such a future note would mirror how an open position in the cash market would behave. The price of the future note and the actual cash ought to be identical.

In the example future of the new instrument, the delivery day can be defined, the coupon cost is known, and the repurchasing costs can be obtained from established sources, such as Bloomberg, etc. As a result, a customer can trade this future at an exchange and it behaves like an open position in the cash market, with carry costs reflected in a daily account charge or credit. Another advantage to this new instrument is the reduction of margin requirements. Thirdly, the repo rate can be the same for both the long position as well as the short position, thus eliminating the spread that most GSCC (Government Securities Clearing Corporation) members charge (e.g., Merrill Lynch). Moreover, no note has to be found and repurchased. Open positions do not require the actual cash instrument to be kept on hand.

Figure 4:
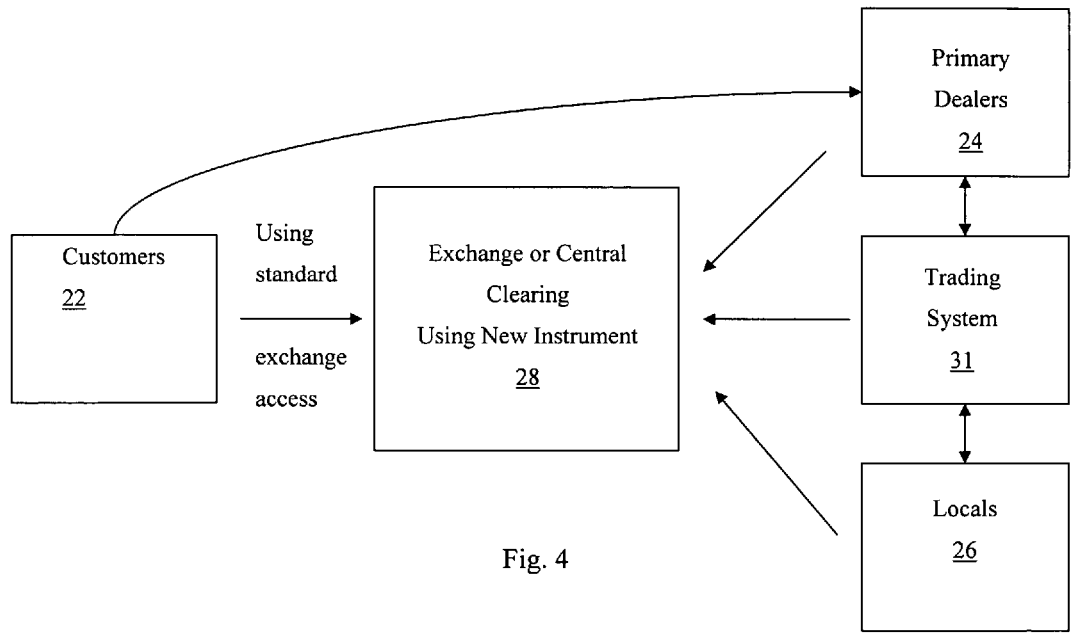
FIG. 4 is a diagram depicting another exemplary trading method using the new instrument described with reference to FIG. 2.

FIG. 4 illustrates an alternative trading method in which customers 22 utilize primary dealers 24 for trades of the usual cash instrument or of the new instrument 14. Customers 22 can still use a standard exchange access to take long or short positions with the exchange 28 using the new instrument. Primary dealers 24 and locals 26 can trade using an electronic trading system 31, such as the Cantor Fitzgerald eSpeed system. Alternatively, the primary dealers 24 and locals 26 can interact directly with the exchange 28.

In one example, the exchange 28 is the Chicago Board of Trade (CBOT). The CBOT lists one of these new instruments so that at the end of each trading day it would be an agreement to deliver the current U. S. ten-year treasury note (and only that note). At the end of the trading day, any outstanding positions are settled by exchange of the actual current U. S. ten-year treasury note for a sum of U.S. dollars equal to the purchase price of the treasury by mechanisms similar to, if not exactly the same as, the settlement procedures used by the FICC. Any customer with exchange access can buy or sell the new instrument 14 (at reduced transaction costs), thereby circumventing participation in the customer trade by the primary dealer 24. In particular, mutual funds and pension funds can effectively buy and sell current U.S. ten-year treasury notes for their portfolios during any trading day, with the actual current U. S. ten-year treasury note being delivered at the end of the trading day. On the next trading day, a new instrument 14 is created that converts into the current U. S. ten-year treasury note at the end of that trading day, and so on. Preferably, a new instrument is created each trading day.

In another example, the CBOT creates one of the new instruments so that on the last trading day of the month the instruments would constitute an agreement to exchange the actual current U. S. ten-year treasury note for a sum of U.S. dollars equal to the purchase price of the treasury by mechanisms similar to, if not exactly the same as, the settlement procedures used by the FICC. Any customer or local with an outstanding position at the close of any trading day would be assessed or credited carry costs (coupon minus repurchasing costs). For example, if a mutual fund buys one of the new instruments on the first trading day of the month and holds it through the last trading day of the month, the mutual fund's account would be credited or debited carry costs each day of the month. The mutual fund would receive one million dollars notional amount of the current ten-year note at a purchase price calculated by standard means.

Figure 5:
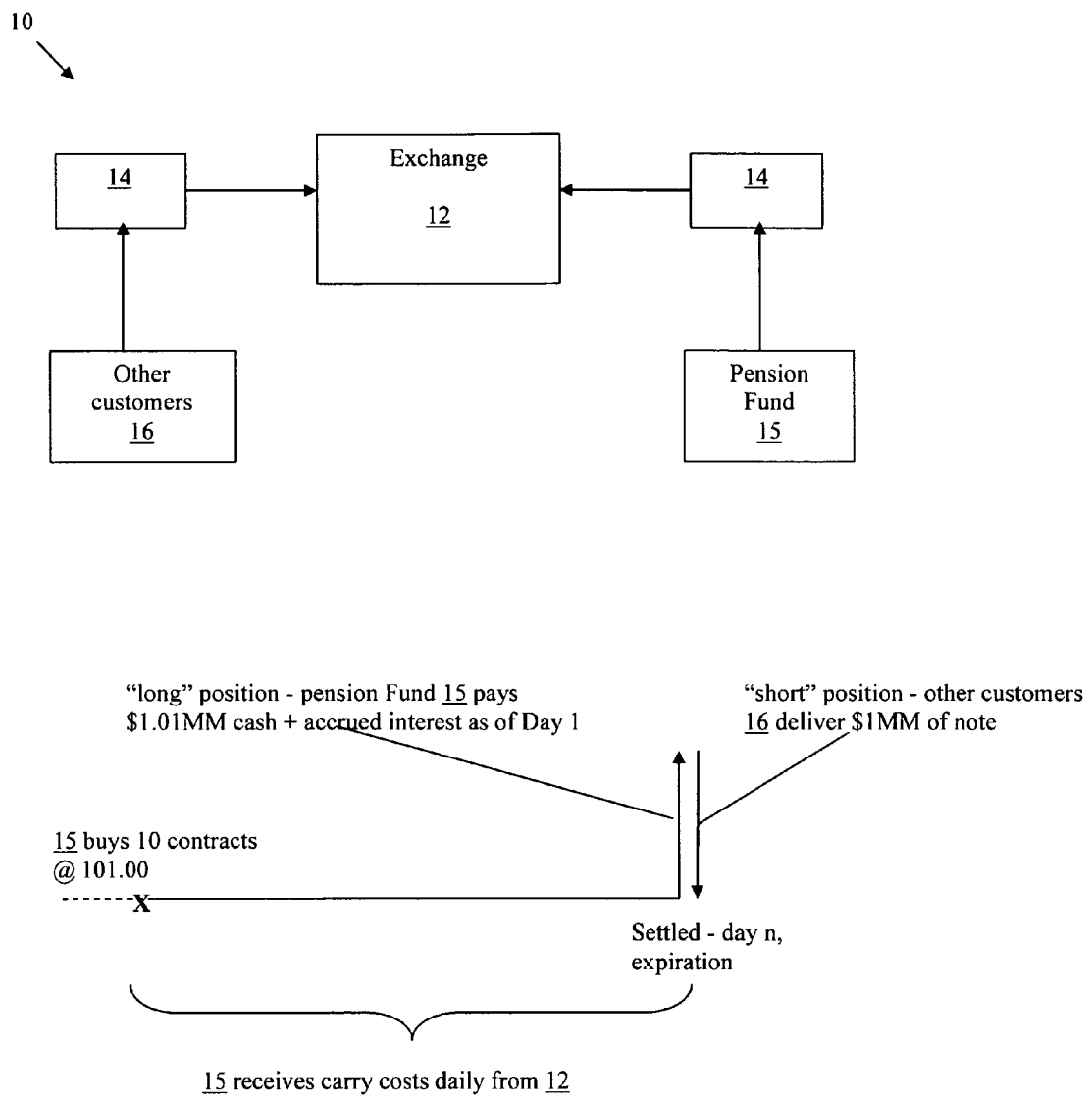
FIG. 5 is a diagram depicting a trading system in accordance with an alternative exemplary embodiment.

In another example, the exchange 12 creates new instrument 14 to trade $100,000 ($0.1MM) notional amount of the current ten-year note. The new instrument expires on the same day the ten-year futures contract expires. All applicable carry costs are credited or debited by the exchange 12 to each account with an open position each day until expiration. In particular, FIG. 5 depicts a pension fund 15, which buys 10 of these new instruments at 101.00 and holds them until expiration. The pension fund 15 would accrue coupon interest less repurchasing costs, credited to its account by the exchange, each day from the initial trade day until expiration. On the day of expiration the pension fund 15 would pay a sum of US dollars equal to the purchase price of the 10 contracts, calculated on the original trade date (purchase price=$1,010,000 (trade price)+accrued interest). Such a scenario would allow the pension fund 15 to manage its cash flow precisely (the fund would not pay for the entire purchase until expiration) and define its future interest income exactly, by knowing exactly which note will be delivered. Other customers 16 who are short the new instruments would deliver a total of $1MM notional amount of the current ten-year note at expiration, and would receive money in return.

Figure 6:
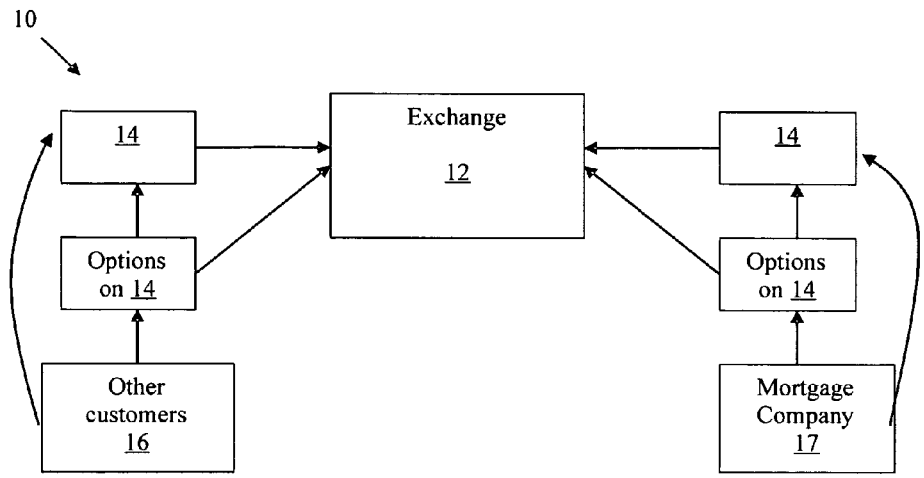
FIG. 6 is a diagram depicting a trading system in accordance with an alternative exemplary embodiment.
Figure 6:
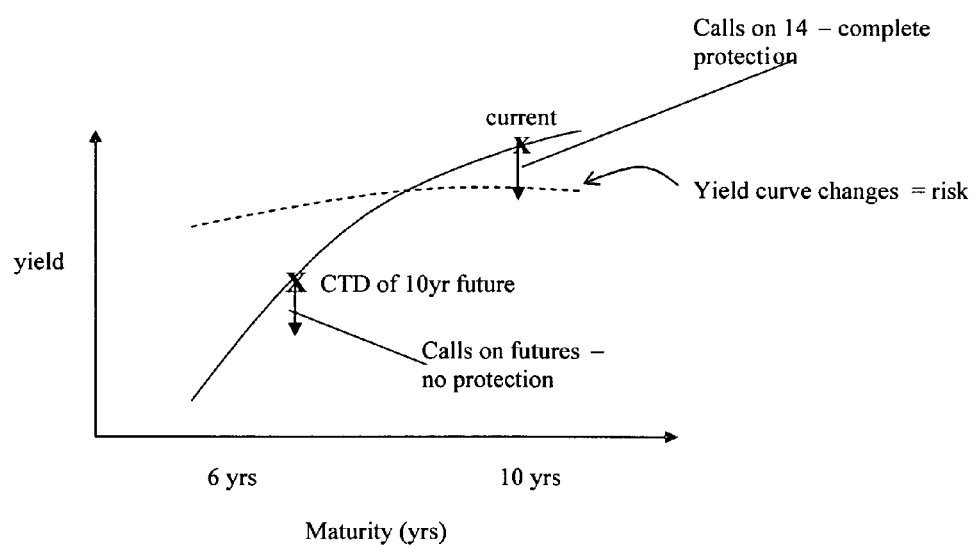

In another example, the exchange 12 creates new instrument 14, described with reference to FIG. 5. The exchange 12 then creates options (calls and puts) on the new instrument 14, with expirations to coincide with the standard interest rate options expirations. Referring to FIG. 6, if a mortgage company 17 is short $200MM current ten-year notes in its portfolio and wants to protect the entire position against loss of value caused by price increases (yield decreases), it could buy 2000 calls on the new instrument 14. The mortgage company 17 would then have an exact hedge, in contrast to the current practice of buying calls on the standard ten-year futures contract. The cheapest to deliver (CTD) note for the standard futures contract is rarely the current ten-year note—the delivered note can be any note with maturity ranging from 6.5 years to 10 years. Using calls on the standard futures contract gives rise to a duration mismatch in the hedge, subjecting the mortgage company 17 to risks caused by changes in the shape of the yield curve (moving from solid line to dotted line in FIG. 6). Options on the new instrument 14 would eliminate this mismatch, thus allowing the mortgage company 17 to hedge its portfolio exactly. In FIG. 6, if the mortgage company 17 buys calls on the standard ten-year futures contract, the company loses money on both the portfolio and the hedge, since the yield falls (price rises) on the current ten-year note but the yield rises (price falls) on the cheapest to deliver note (the ten-year future).

Figure 7:
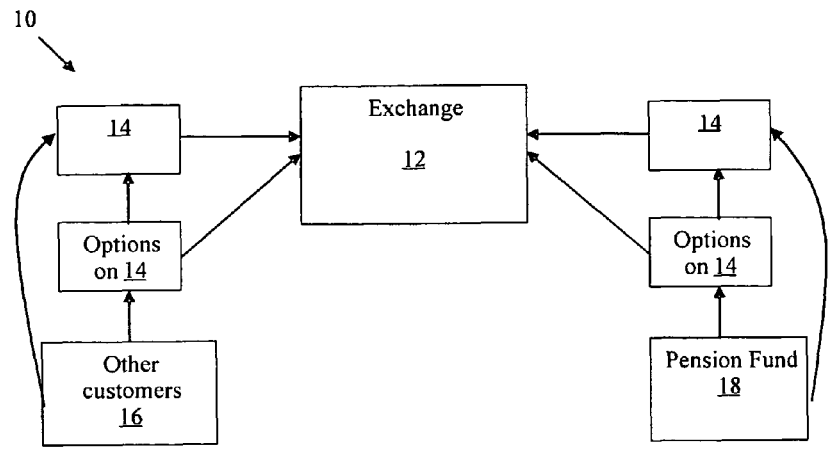
FIG. 7 is a diagram depicting a trading system in accordance with an alternative exemplary embodiment.
Figure 7:
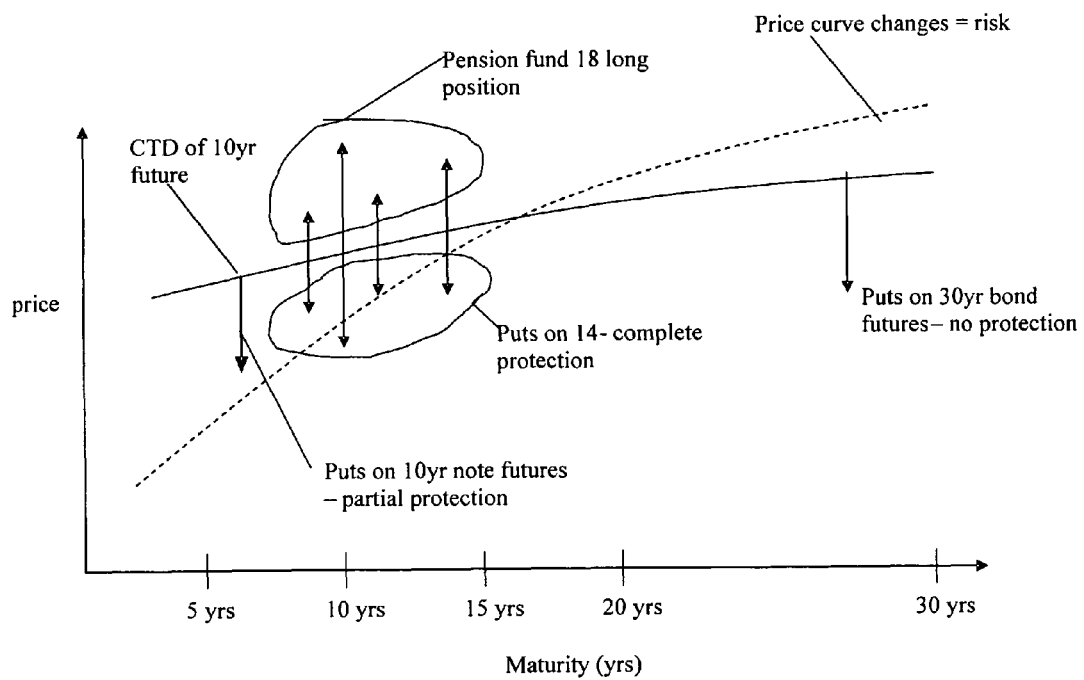

According to another example, the exchange 12 creates new instruments 14 which have as their deliverable contract $100,000 ($0.1MM) notional amount of each off-the-run US treasury. The new instruments 14 have an expiration day at the end of the current quarter year. Next, the exchange 12 creates options on the new instruments 14 that convert to the underlying new instruments 14 upon the options expiration (one week before the end of the current quarter year). Referring to FIG. 7, if a pension fund 18 is long off-the-run US treasuries with maturities ranging from 8 to 14 years, it can protect the value of its holdings exactly, by purchasing puts on the new instruments 14. The current practice is to purchase puts on both the ten-year and the 30-yr futures, giving rise to substantial price curve risks. In FIG. 7, if the price curve shifts from the solid line to the dotted line, puts on the standard futures would not adequately hedge the portfolio, leading to a severe loss of funds. The puts on the ten-year note futures would partially protect the portfolio, but the puts on the 30-year bond futures would not. The only other way a pension fund 18 can currently hedge its portfolio is to buy options over-the-counter (OTC). As noted above, OTC contracts have many disadvantages, most notably counterparty risk (eliminated by an exchange 12), high transaction costs, and substantial margin requirements. Options on the new instruments 14 are much better for portfolio managers because the exchange 12 removes or lowers these barriers.

Figure 8:
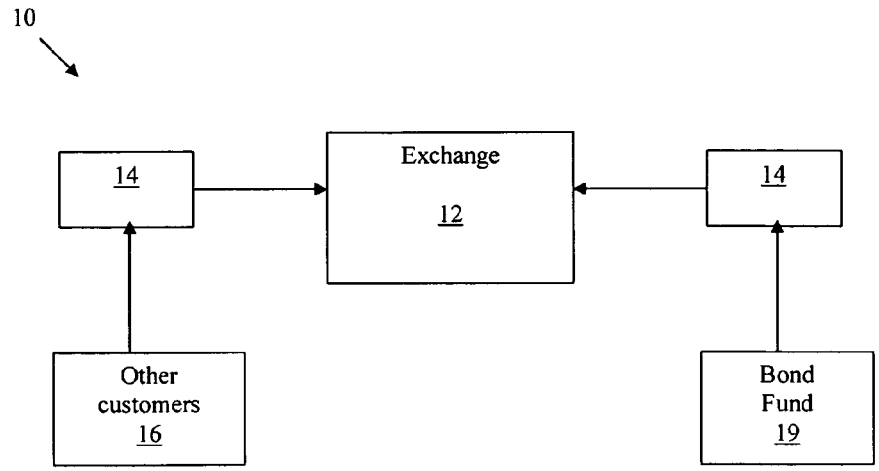
FIG. 8 is a diagram depicting a trading system in accordance with an alternative exemplary embodiment.
Figure 8:
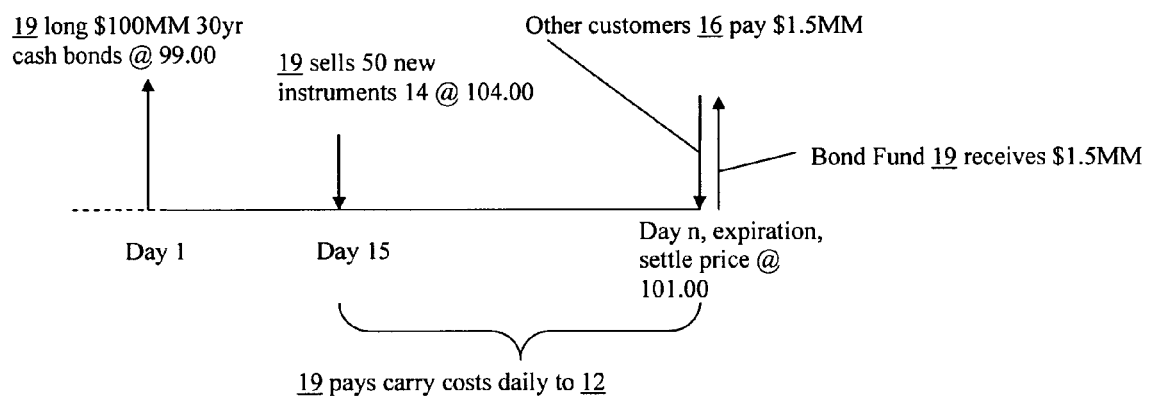

In another example of the new instrument, the exchange 12 creates new instrument 14 with $1MM face value, that is based on the current on-the-run 30-year US treasury bond (see FIG. 8). The new instrument 14 accrues interest and repurchasing costs daily but is cash settled at expiration. For example, a bond fund 19 is long $100MM of the current US 30-year bond at a price of 99.00. After a substantial rise in price to 104.00 on day 15, the fund 19 wishes to hedge half of its profits without actually selling the bonds. They could sell 50 contracts ($50MM notional value) at 104.00. Each day the fund is short the 50 new instruments 14, carry costs are deducted from its account by the exchange. At a predetermined time on expiration day, the expiration price of the new instrument is set equal to the cash price of the 30-year bond. If the price of the bond has dropped since day 15 to 101.00 at expiration, the bond fund's account would be credited, by the exchange, $1.5MM (=$10,000 per point per contract×50 contracts×3 points). The other customers 16 who are short from 104.00 would pay the exchange an equal amount.

While several embodiments of the invention have been described, it is to be understood that modifications and changes will occur to those skilled in the art to which the invention pertains. For example, while the new instrument 14 is described using the example of futures and cash spots, the system is not limited to such structures and arrangements. A wide variety of structures may be applied to the new instruments. Accordingly, the claims appended to this specification are intended to define the invention precisely.

The invention claimed is:

1. A method of trading financial instruments covering specific deliverable products on a daily settlement basis, the method comprising:

trading, on a trading system including a processor, a standardized treasury contract obligating a buyer and a seller to settle the standardized treasury contract based on a price of the standardized treasury contract at a first effective date, through an exchange clearing house that guarantees payment to the buyer of any amount owed to the buyer from the seller as a result of the standardized treasury contract and that guarantees payment to the seller of any amount owed to the seller from the buyer as a result of the standardized treasury contract, wherein the standardized treasury contract is an exchange traded instrument that defines a single coupon rate and a single maturity date of an issued treasury instrument to be exchanged upon settlement of the standardized treasury contract at the end of the first effective date and wherein the issued treasury instrument is one of a plurality of treasury instruments available to settle a second standardized treasury contract.

2. The method of claim 1, wherein trading a standardized treasury contract comprises trading directly from customer to the exchange clearing house via an exchange access.

3. The method of claim 1, wherein trading a standardized treasury contract comprises trading directly from a dealer to the exchange clearing house via an exchange access.

4. The method of claim 1, further comprising settling the standardized treasury contract at the end of the first effective date, wherein the first effective date is the trading date of the standardized treasury contract.

5. The method of claim 4, further comprising expiring the standardized treasury contract at the end of the first effective date.

6. The method of claim 4, wherein settling the standardized treasury contract comprises exchanging actual current ten-year treasury notes for a sum of money equal to a purchase price of the standardized treasury contract.

7. The method of claim 6, further comprising creating a new deliverable instrument at the beginning of the next trading day after the first effective date, wherein the new deliverable instrument converts into current ten-year treasury notes at the end of the next trading day.

8. The method of claim 4, wherein settling the standardized treasury contract comprises exchanging an actual current Treasury Bill, Two-year note, Five-year note, or Treasury Bond for a sum of money equal to a purchase price of the standardized contract.

9. The method of claim 6, further comprising creating a new deliverable instrument at the beginning of the next trading day after the first effective date, wherein the new deliverable instrument converts into a current Treasury Bill, Two-year note, five-year note, or Treasury Bond at the end of the next trading day.

10. The method of claim 4, wherein settling the standardized treasury contract comprises exchanging an actual off-the-run Treasury Bill, Treasury note, or Treasury Bond for a sum of money equal to a purchase price of the standardized treasury contract.

11. The method of claim 6, further comprising creating a new deliverable instrument at the beginning of the next trading day after the first effective date, wherein the new deliverable instrument converts into an off-the-run Treasury Bill, Treasury note, or Treasury Bond at the end of the next trading day.

12. The method of claim 4, wherein settling the standardized treasury contract comprises exchanging an actual debt instrument for a sum of money equal to a purchase price of the standardized contract.

13. The method of claim 6, further comprising creating a new deliverable instrument at the beginning of the next trading day after the first effective date, wherein the new deliverable instrument converts into an actual debt instrument at the end of the next trading day.

14. The method of claim 4, wherein settling the standardized treasury contract comprises exchanging an option, swap, swaption, or other derivative for a sum of money equal to a purchase price of the option, swap, swaption, or other derivative.

15. The method of claim 6, further comprising creating a new deliverable instrument at the beginning of the next trading day after the first effective date, wherein the new deliverable instrument converts into an option, swap, swaption, or other derivative at the end of the next trading day.

16. The method of claim 1, wherein the first effective date is any number of days after a trade date.

17. The method of claim 1, wherein carry costs are charged or credited to accounts with an open position.

18. The method of claim 1, wherein the plurality of treasury instruments comprise a plurality of distinct treasury instruments.

19. The method of claim 18, wherein the plurality of distinct treasury instruments comprise at least a first treasury instrument and a second treasury instrument, wherein the first treasury instrument has a greater value than the second treasury instrument.

20. The method of claim 18, wherein the plurality of distinct treasury instruments comprise at least a first treasury instrument and a second treasury instrument, wherein the first treasury instrument has a later settlement date than the second treasury instrument.

21. The method of claim 1, wherein the second standardized treasury contract is configured to be traded on a second trading system.

* * * * *